June 22, 1948.  H. DAHL  2,443,815
TOOL FOR PREPARING CONTACT BLANKS
Original Filed Jan. 30, 1942
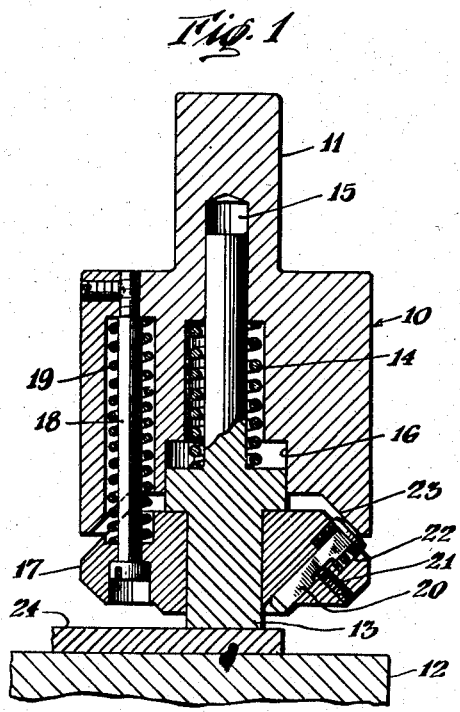
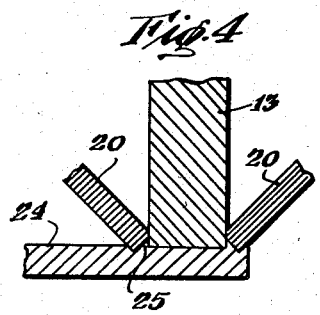
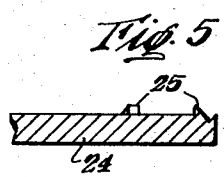
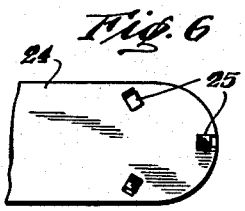
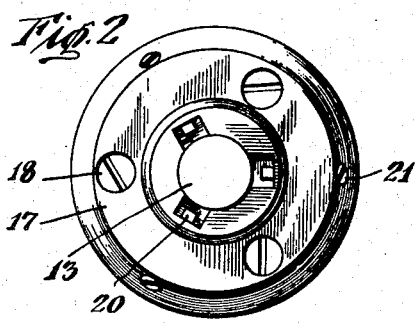
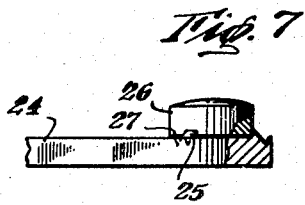
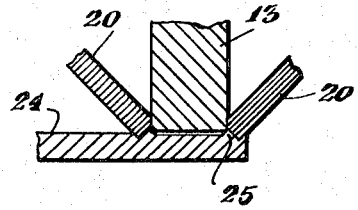
INVENTOR.
Harry Dahl
BY Chester F. Carlson
ATTORNEY Patented June 22, 1948

2,443,815

UNITED STATES PATENT OFFICE 2,443,815

TOOL FOR PREPARING CONTACT BLANKS

Harry Dahl, Indianapolis, Ind., assignor to P. R. Mallory & Co., Inc., Indianapolis, Ind., a corporation of Delaware Original application January 30, 1942, Serial No. 428,830, now Patent No. 2,406,281, dated August 20, 1946. Divided and this application March 13, 1944, Serial No. 526,276

1 Claim. (Cl. 78—1)

This invention relates to a tool for preparing a contact blank to aid in locating and securing electric contacts.

An object of the invention is to improve tools for the above purpose.

In the drawing:

Figure 1 is a vertical section through a contact backing and a locating tool for preparing said backing to receive a contact;

Figure 2 is an underneath view of said tool;

Figures 3 and 4 illustrate the method of preparing the backing;

Figures 5 and 6 show the completed backing; and

Figure 7 shows the completed contact assembly.

Up to the present time, considerable difficulties have been encountered in accurately locating contacts on blanks for such operations as brazing, resistance welding, electrobrazing, etc. Wherever it is possible, welding tables have been provided so that the contacts during the brazing operation would center properly. In blanks of heavier thickness it is difficult to provide welding tables and it has become necessary to use either special boats in furnace brazing or expensive welding fixtures for electrobrazing and resistance welding.

The present invention overcomes these difficulties and provides accurate means to produce ears on the contact blanks for accurately locating the contacts on a flat surface.

While a preferred embodiment of the invention is described herein, it is contemplatel that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawings the locating tool 10 is provided with a shank 11 for clamping by the tool holder of a suitable press, such as a kick press, punch press or any power press, having a flat bed 12. Tool 10 is provided with a central hold-down punch 13 which is urged by coil spring 14 toward the bed of the press and is slidable in central guide bores 15 and 16.

A collar 17 encircles the lower portion of hold-down punch 13 and is slidable thereon. It is retained in position by the heads of three spaced bolts 18 upon which bolts it is slidable. Bolts 18 are secured in the body of tool 10 and surrounded by coil springs 19 which urge collar 17 downward against the heads of bolts 18. Collar 17 carries three spaced staking punches 20 extending diagonally downward and inward from the outer edge of the upper beveled surface of the collar. These staking punches are slidable in their guideways but are prevented from rotating by set screws 21 and are normally retracted upwardly by encircling coil springs 22 so that their heads project above the beveled upper surface of collar 17. The main body of tool 10 has an inwardly beveled flange 23 which engages the heads of staking punches 20. The tips of punches 20 may be squared or of other suitable design.

In operation the contact backing blank 24, which may, for example, be a flat elongated contact arm, is laid on the bed 12 of the press and located in position by a suitable fixture. The tool 10 is then brought down against it by the operation of the press. The blank is first engaged by hold-down punch 13 which holds it firmly in position under spring pressure. As the tool descends further flange 23 on the tool body engages the heads of staking punches 20 and forces them downward and inward causing them to sink into the surface of the blank 24 and press up ears 25 at three spaced points around the periphery of hold-down punch 13, as shown in Figure 3.

It may be that this operation will force punch 13 up a little due to the raising of metal, as shown in Figure 3. If this takes place, the central area can be coined and flattened by bringing the tool down until the end wall of guide bore 16 engages the shoulder of the hold-down punch, thereby forcing it firmly down on the blank to effect a coining operation, as indicated in Figure 4. In some cases the coining may not be required.

The completed blank 24, shown in Figures 5 and 6, has a plane central area surrounded by three spaced locating ears 25. A disc contact 26 of such size as to fit the space provided can thereby be readily positioned for brazing by a brazing layer 27, as shown, or by resistance welding or other methods.

While the present invention, as to its objects and advantages, has been described herein as carried out in specific embodiments thereof, it is not desired to be limited thereby but it is intended to cover the invention broadly within the spirit and scope of the appended claim.

The present application is a division of co-pending application Serial Number 428,830, filed January 30, 1942, now Patent No. 2,406,281, granted August 20, 1946.

What is claimed is:

A tool for preparing a contact mounting blank comprising a tool body having means for mounting on a press arm, a central bore therein, a hold-down punch slidable in said bore and spring means urging said punch forward, a collar slidable on the shank of said hold-down punch and carrying a plurality of staking punches slidable forwardly and inwardly therein, springs urging said staking punches back, and a pressure applying flange on said tool body engaging the heads of said staking punches when said collar is resting on a blank to be prepared to press the tips of said punches into the blank surface at spaced points about the periphery of said hold-down punch.

HARRY DAHL.

REFERENCES CITED

The following references are of record in the file of this patent:

UNITED STATES PATENTS

| Number | Name | Date |
| --- | --- | --- |
| 531,731 | Marquart | Jan. 1, 1895 |
| 841,577 | Schneider | Jan. 15, 1907 |
| 1,729,346 | Kehoe | Sept. 24, 1929 |
| 1,966,663 | Drake | July 17, 1934 |
| 1,979,472 | Kelley | Nov. 6, 1934 |
| 2,088,978 | Serra | Aug. 3, 1937 |
| 2,138,404 | Haas | Nov. 29, 1938 |